UNITED STATES PATENT OFFICE.

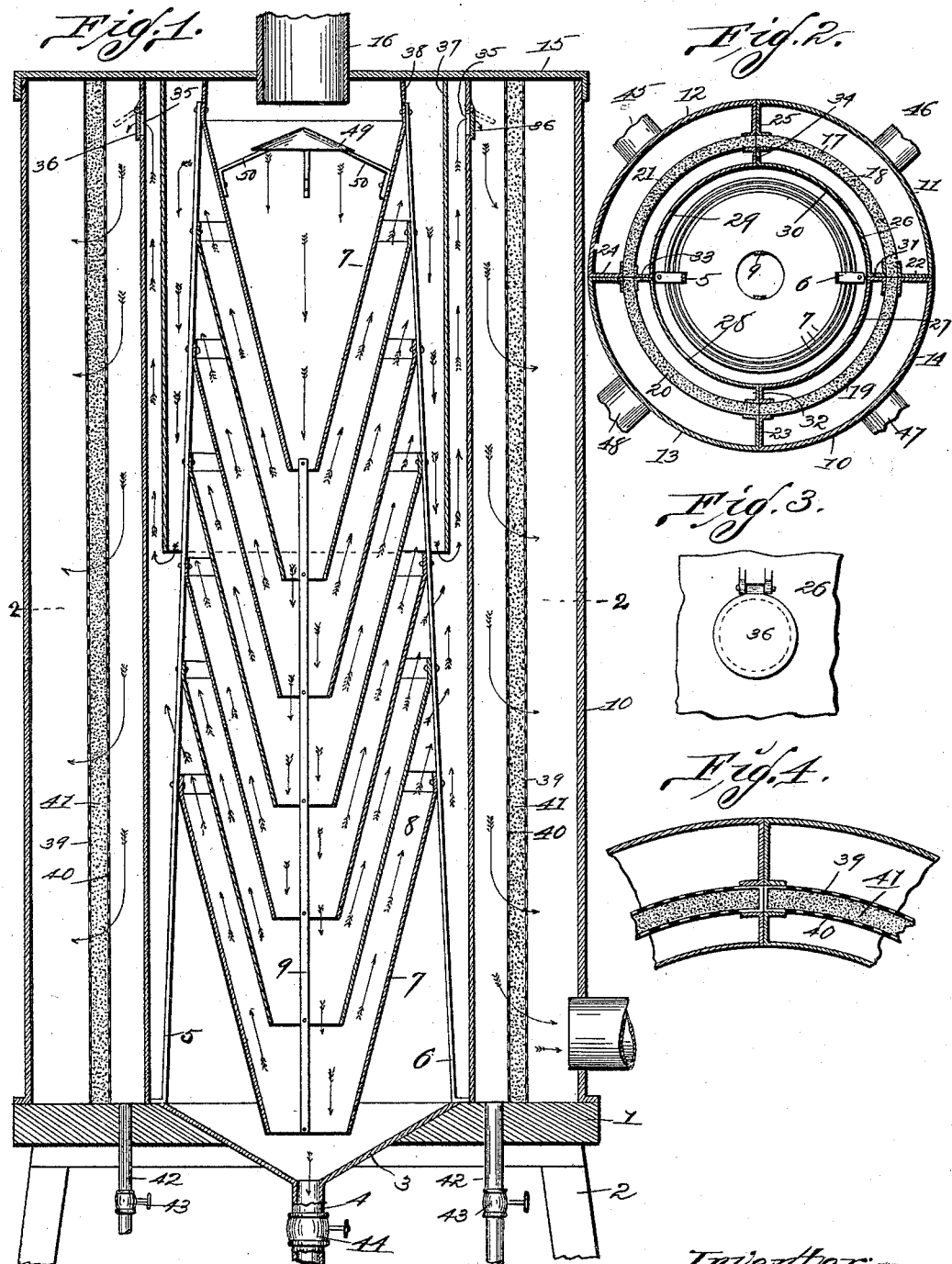

LLOYD ROWAN, OF SHAWNEETOWN, ILLINOIS.

WATER-SETTLER.

SPECIFICATION forming part of Letters Patent No. 584,406, dated June 15, 1897.

Application filed June 24, 1896. Serial No. 596,800. (No model.)

*To all whom it may concern:*

Be it known that I, LLOYD ROWAN, of the city of Shawneetown, Gallatin county, State of Illinois, have invented certain new and useful Improvements in Water-Settlers, of which the following is a full, clear, and exact description, reference being had to the accompanying drawings, forming a part hereof.

My invention relates to a water settler and filter; and it consists in the novel construction, combination, and arrangement of parts hereinafter described and claimed.

In the drawings, Figure 1 is a vertical sectional view of my water settler and filter. Fig. 2 is a horizontal sectional view of the device shown in Fig. 1, taken on the line 2 2. Fig. 3 shows a trap-door of which I make use. Fig. 4 is an enlarged detail horizontal sectional view illustrating the construction of the filter-walls.

In the construction of my improved water settler and filter I employ the base 1, supported upon suitable framework 2, and in the center of said base is a circular opening in which is placed the funnel 3, having the discharge-pipe 4 projecting downwardly from its center. Bars 5 and 6 are attached to the outer rim of said funnel and extend upwardly, and a series of funnels 7 are attached to said bars 5 and 6 in such a way that the openings of said funnels are in vertical alinement. The funnels 7 are nested in such a way as to form passages 8 between the outside of one funnel and the inside of the next lower funnel.

The bars 9 are positioned within the smaller openings of the funnels and attached to said funnels, as shown in Fig. 1, for the purpose of holding the openings of the funnels in vertical alinement.

A circular casing 10, formed of the sections 11, 12, 13, and 14, is mounted upon the frame 1 in a position concentric to the funnel 3, and a cap 15 is placed upon the upper end of said casing and incloses the same. An inlet-pipe 16 penetrates the center of the cap 15.

A filtering-wall 17 is placed inside of the casing 10, and consists of the sections 18, 19, 20, and 21. The filtering-wall 17 is in a concentric position relative to the casing 10, and is connected therewith by the walls 22, 23, 24, and 25. A circular casing 26 is placed inside of the filtering-wall 17 and in a position concentric therewith, and consists of the sections 27, 28, 29, and 30, and walls 31, 32, 33, and 34 connect said casing with said filtering-wall. The lower end of said casing is concentric with the funnel 3 and outside of the large end of said funnel. In the upper end of said casing are apertures 35, covered by the trap-doors 36, which open outwardly. Inside of the casing 26 is a circular casing 37, which is attached to the cap 15 and depends downwardly between the casing 26 and the bars 5 and 6 and in a concentric position relative thereto. The upper end 38 of the upper one of the funnels 7 is attached to the under side of the cap 15.

In the construction of the filtering-wall 17 I use sections 39 and 40, of wire screen or suitable lattice-work, and the space between said sections is filled with suitable filtering material 41. Pipes 42 penetrate the base 1 between the filtering-wall 17 and the circular casing 26, there being one pipe for each of the sections of which said filtering-wall is composed, and suitable cut-off valves 43 are positioned in said pipes to regulate the flow of water therefrom. A cut-off valve 44 is positioned in the pipe 4, discharging from the funnel 3.

Outlet-pipes 45, 46, 47, and 48 are inserted in the lower end of the casing 10, there being one outlet-pipe for each of the sections of which the said casing is composed.

In the upper part of the upper funnel 7 and directly below the end of the pipe 16 is a deflector 49, the arms 50 of which are attached to the inner face of said funnel. The deflector 49 breaks the force of the water that comes through the pipe 16 and directs it against the wall of said funnel. The object is to prevent the water from passing from the pipe 16 directly through the funnels 7 to the bottom of the device, and thus stirring up the mud.

In the practical operation of my water settler and filter the water is discharged into the device through the pipe 16 and is forced into the upper one of the funnels 7. Said funnel being attached directly to the cap 15, the water can only escape from said funnel by passing downwardly through the small end of said funnel, and from thence the water will pass downwardly through the successive funnels to the funnel 3 until the device is nearly filled with water, when the water will begin to rise upon the outside of the funnels. Assuming that the device is in operation and filled with water, water passing through the pipe 16 will pass down through the lower end of the upper one of the funnels 7 and upwardly on the outside of said funnel and over the upper edge of the next adjoining funnel until it strikes the casing 37. Then it will pass downwardly inside of said casing to the lower end thereof, and thence upwardly between the casing 37 and the casing 26 to the openings 35 in said casing 26, where it will lift the trap-doors 36 and pass outwardly into the space between said casing 26 and the filtering-wall 17. It will then filter through said wall 17 into the space between said wall and the casing 10, from whence it may be drawn off as desired through the discharge-pipes 45, 46, 47, and 48. During this operation the heavy sediment and other impurities in the water will settle down through the funnels to the funnel 3, from whence it may be drawn off at intervals, as desired, by manipulation of the cut-off valve 44 in the pipe 4, or by leaving said valve open a continuous flow of impure water will pass through said pipe 4. The sediment which is deposited outside of the casing 26 and inside of the filtering-wall 17 may be drawn off through the pipes 42. Each of the funnels 7 acts as a reservoir, in which the water rests, and sediment passes downwardly by force of gravity, while the clear water passes upwardly, as before described. The clear water is drawn off through the openings 35 in the casing 26 and the muddy water is left inside of said casing to be drawn off through the pipe 4.

By constructing the device in sections or by dividing it up into sections by the use of the walls 22, 23, 24, and 25 between the filtering-wall and the casing 10, and the walls 31, 32, 33, and 34 between the filtering-wall and the casing 26, a part of the device may be used while the other part is being cleaned or repaired. For instance, the section of the device drained by the pipe 45 may be cleaned by putting a back pressure of water in said pipe 45, opening the pipe 42, draining said section, and forcing water backward through the section 21 of the filtering-wall 17, and this may be done while the other part of the device is in use, as before described, and in this way any one of the sections drained by the pipes 46 47 48 may be cleaned in the same manner.

By the construction shown and described herein I utilize the centrifugal force to separate clear water from muddy water. The entire volume of water being forced into the device through the inlet-pipe 16 downwardly through the upper funnel with some force, the solid matter contained in the water will not make short turns necessary to pass from the lower end of a funnel and then upward on the outside of the same funnel, but will be carried by its momentum downwardly and successively from one funnel to the other until it reaches the drain-pipe 4. This separates the muddy water from the clear water to a considerable extent. Then, again, the clear water, passing upwardly and outwardly from the large ends of the funnels, is again deflected downwardly by the circular casing 37 and again the solid matter contained in the water is started on a downward course, and instead of making the short turn around the lower edge of said casing 37 its momentum carries it down inside of the casing 26 and the clear water passes up between the walls of the casings 37 and 26 and out through the openings 35, as before described.

A water settler and filter of my improved construction may be built upon any desired scale from a size suitable for domestic use to a size suitable for the largest waterworks system without departing from the spirit of my invention.

I claim—

1. A water-settler, comprising a base, a casing mounted upon said base, a series of funnels arranged one above the other within said casing, a second casing surrounding the first-mentioned casing, a filtering-wall outside of the first-mentioned casing and inside of the second-mentioned casing, and inlet and outlet pipes communicating with the spaces within the filter, substantially as specified.

2. A water-settler, comprising a base, a casing mounted upon said base, a series of funnels mounted one above the other within said casing, a second casing, open at its lower end, and mounted within the upper part of the first-mentioned casing, a filtering-wall surrounding the first-mentioned casing, a third casing surrounding said filtering-wall and inlet and outlet pipes communicating with the spaces within said filter, substantially as specified.

3. A water-settler, comprising a base, a casing mounted upon said base, a series of funnels mounted one above the other within said casing, a pipe discharging into the upper end of the upper one of said funnels, a deflector below the discharge end of said pipe and within said upper funnel, a filtering-wall surrounding said casing, a second casing surrounding said filtering-wall, and outlet-pipes communicating with the spaces within said filter, substantially as specified.

4. A water-settler, comprising a base, a casing mounted upon said base, a series of funnels mounted one above the other within said casing, a pipe discharging into the upper end of the upper one of said funnels, a deflector below the discharge end of said pipe and within said upper funnel, a filtering-wall surrounding said casing, a second casing surrounding said filtering-wall, a third casing open at its lower end and mounted within the upper part of the first-mentioned casing, substantially as specified.

5. A water-settler comprising a base having a funnel-shaped opening in its center, an outlet-pipe attached to said funnel-shaped opening, a casing upon said base and surrounding said opening, a series of funnels within said casing, a pipe communicating with the upper one of said funnels, a second casing surrounding said funnels and attached to said base inside of said first-mentioned casing and horizontal openings in the upper end of said last-mentioned casing, substantially as specified.

6. A water-settler comprising a base having a funnel-shaped opening in its center, an outlet-pipe attached to said funnel-shaped opening, a casing upon said base and surrounding said opening, a series of funnels within said casing, a pipe communicating with the upper one of said funnels, a second casing surrounding said funnels and attached to said base inside of said first-mentioned casing and horizontal openings in the upper end of said last-mentioned casing, a third casing open at its lower end and surrounding the upper part of said funnels and inside of said second casing, substantially as specified.

7. A water settler and filter comprising a base having a funnel-shaped opening in its center, an outlet-pipe leading from said opening, a series of funnels suspended above said opening, an inlet-pipe communicating with the upper one of said funnels, a casing surrounding the upper part of said funnels and having an open lower end, a casing attached to said base and surrounding said funnels and said first-mentioned casing and having horizontal openings in its upper end, a wall of filtering material surrounding said last-mentioned casing, a casing surrounding said wall of filtering material and outlet-pipes in said casing, substantially as specified.

8. A water settler and filter, comprising a base having a funnel-shaped opening in its center, an outlet-pipe leading from said opening, a series of funnels suspended above said opening, an inlet-pipe communicating with the upper one of said funnels, a casing surrounding the upper part of said funnels and having an open lower end, a casing attached to said base and surrounding said funnels and said first-mentioned casing and having horizontal openings in its upper end, a wall of filtering material surrounding said last-mentioned casing, a casing surrounding said wall of filtering material, outlet-pipes in said casing, walls positioned radially between said second casing and said filtering-wall, and between said filtering-wall and said last-mentioned casing, and pipes penetrating said base to the space between said second casing and said filtering-wall, substantially as specified.

In testimony whereof I affix my signature in presence of two witnesses.

LLOYD ROWAN.

Witnesses:
 EDWARD E. LONGAN,
 MAUD GRIFFIN.